Patented Sept. 30, 1924.

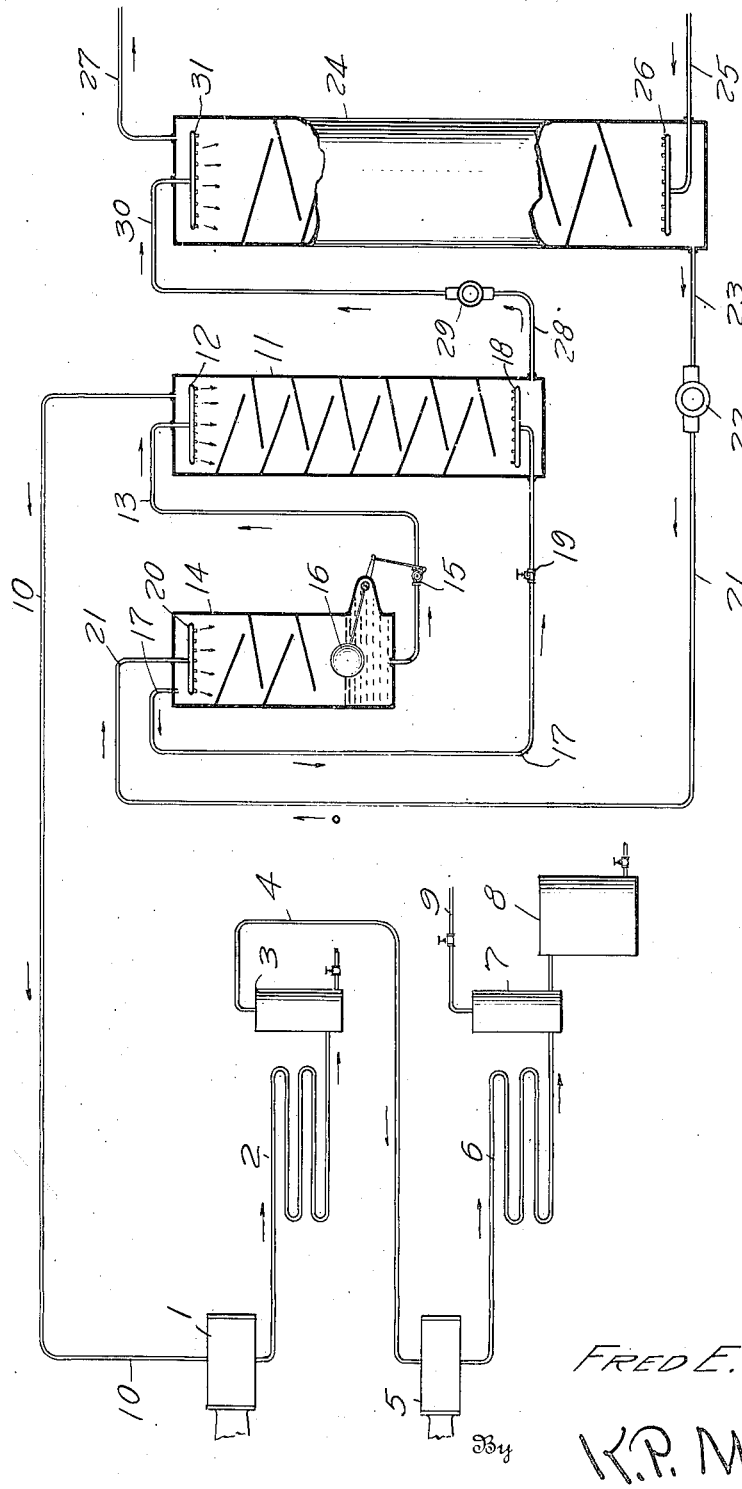

1,510,434

UNITED STATES PATENT OFFICE.

FRED E. HOSMER, OF SHREVEPORT, LOUISIANA.

PROCESS OF RECOVERING GASOLINE.

Application filed June 6, 1923. Serial No. 643,743.

*To all whom it may concern:*

Be it known that I, FRED E. HOSMER, a citizen of the United States, residing at Shreveport, in the parish of Caddo and State of Louisiana, have invented certain new and useful Improvements in Processes of Recovering Gasoline, of which the following is a specification.

This invention relates to processes of recovering gasoline; and it comprises an improvement in the recovery of gasoline from natural gas, oil well gas, etc., by the absorption method wherein an oily vehicle or menstruum which has been used for absorbing and collecting vapors from such gas is stripped of the absorbed volatile oils by exposure to reduced pressure, such stripping being in a plurality of stages under successively diminishing pressure and being aided in a later stage by a current of gases evolved in an earlier stage; all as more fully hereinafter set forth and as claimed.

In addition to the normally gaseous hydrocarbons, methane, ethane and propane, natural gas and oil well gas carry vapors of more easily condensable hydrocarbons; often in quantities sufficient to be worth while recovering. Various ways of effecting this recovery and producing what is known as "casinghead gasoline," are in use. Sometimes the gas is compressed and cooled; sometimes it is submitted to intense refrigeration, and sometimes it is scrubbed with an absorbent oil. Sometimes various combinations of these expedients are employed. The present invention relates more particularly to an improvement in the methods where recovery is by absorption; the gas being scrubbed with an absorbent oil under whatever pressure may be convenient. As the absorbent oil, any convenient petroleum oil, such as kerosene, naphtha, "mineral seal oil," lubricating oil, etc., may be used. In certain other and copending applications (Serial Nos. 558,329 and 627,244), I have disclosed a method of extraction wherein I use as the absorbent liquid a residue of relatively low volatile oils produced by self-evaporation of casinghead gasoline itself. Gasoline recovered from natural gas consists of a mixture of various hydrocarbon oils, some of which are more volatile than others; and in said applications I have disclosed a method of utilizing this fact wherein the recovered gasoline is submitted to self-evaporation, ordinarily under reduced pressure, producing vapors of the more volatile components and a chilled residue of relatively less volatile oils. This residual liquid, being very cold and containing nothing foreign to the casinghead gasoline, is an advantageous absorbent. This absorbent is advantageously, but not necessarily, employed in the present method.

In the ordinary absorption methods of recovering casinghead gasoline, the oil for scrubbing, or wash oil, is brought into contact with the gas to be treated in any convenient way giving a large area contact between the two. Condensation and absorption of the vapors by the scrubbing oil is facilitated by the use of pressure; but high pressure is not necessary. In a way, the pressure and the quantity of scrubbing oil which may be used are reciprocal; the lower the pressure the greater is the proportion of oil advantageously used. The charged wash oil is stripped of the gasoline taken up in various ways. Usually, the charged oil is put into or through a still and the gasoline boiled off; the residual hot oil being then evolved to fit it for reuse as an absorbent. This method is subject to various inconveniences, but is that ordinarily used. Propositions have been made to strip charged oil at the ordinary temperature by the use of vacuum or reduced pressure but this has not proved practicable, for the reason that, in the ways heretofore proposed, effectual stripping could not be secured in convenient apparatus, or in a convenient short period of time. Stripping is not quick enough.

I have found however that by a certain modification of the vacuum or reduced pressure way of stripping, quick and thorough stripping may be secured in convenient types of apparatus and without the necessity of using heated stills. While my improvement is particularly advantageous in connection with the method of my acknowledged copending applications, it is not restricted thereto, but may be employed in any process recovering gasoline by the absorption method. I shall however describe it more particularly hereinafter as used in connection with the method of said acknowledged applications.

Any wash oil used in recovering gasoline from natural gas takes up a certain amount of the gas itself in addition to the vapors of the condensable hydrocarbons whose recovery is desired. It likewise becomes charged to a greater or less extent with various intermediate hydrocarbons (butanes, pentanes, etc.). This fact offers some inconvenience in practice, since the product obtained in stripping charged scrubbing oil in a still is not completely condensable again by pressure or pressure and cold. And to the extent that condensation is not complete, there is a loss of vapors escaping the condensing devices with the uncondensed gas. The fact of the presence of these gases in the charged scrubbing oil is however utilized in the present invention.

I have found that by releasing the absorbed gases, or some portion of them, from the charged oil by a preliminary evaporation under somewhat reduced pressure and by then effecting a thorough contact, advantageously in countercurrent, of the released gases with the residue of the charged oil under a higher degree of vacuum, quick stripping can be effected. The current of gases cooperates with the reduced pressure in effecting stripping. In the ordinary embodiment of my invention, oil coming from any suitable scrubbing device in which it has been used to scrub gas and charged with absorbed light oils, passes successively through a plurality of chambers (usually two) of increasing vacuum; being filmed out in each such chamber in some way to expose a large area surface for evaporation. Whatever gases and vapors are evolved in a preliminary chamber under slightly reduced pressure, are led through a later chamber under higher vacuum in effective contact with the oil from the first chamber. In this later chamber, a high degree of suction or vacuum prevails.

The oil stripped under reduced pressure in the way just described, is left cold and suitable for immediate reuse in scrubbing more gas. It is not necessary, as with ordinary distillation methods, to submit it to a special cooling prior to reuse in treating gas.

In the accompanying illustration, I have shown, more or less diagrammatically, certain assemblages of apparatus elements, the showing being in the nature of a flow sheet. Certain of the diagrammatically shown elements are in central vertical section. In this showing—

Element 1 is a vacuum or suction pump of any usual type discharging on the compression side through cooling device 2. Cooled condensate here formed accumulates in trap tank 3. Uncondensed material passes by pipe 4 to compression pump 5 where it is submitted to further pressure, the compressed products being thereafter cooled in cooler 6 and sent to trap tank 7. From this tank, liquid is drawn into storage tank 8, while uncondensed gases and vapors pass to any convenient place of disposition through pipe 9. Returning to the vacuum pump 1, on the suction side it connects by means of pipe 10 with high vacuum stripper 11. This is in the form of a tower provided with any suitable interior surface-giving packing; coke, tile, etc. Baffles, shelves, etc. may be used. It is desirable to produce a large area contact between liquid and gas. Near its top, it is provided with a liquid spraying or distributing device 12, receiving liquid through 13 from the base of low vacuum stripper 14. This also may be a tower-like device. In order to maintain sealing liquid in 13, it is usually constructed as shown with a trapped portion and is provided with valve 15 governed by float device 16. Preliminary stripper 14 may be maintained at atmospheric pressure or slightly below, while ordinarily I desire to maintain a rather high degree of suction in the high vacuum stripper, say, around 25 inches suction. The difference in pressure causes a flow of liquid from the preliminary stripper to the high vacuum stripper. Communicating with this preliminary stripper at or near its top is gas outlet line 17 passing to and entering the base of the high vacuum stripper. As shown, it is provided with distributing device 18. Regulation of the flow of gas through this line is afforded by regulating valve 19. As shown, charged oil enters the top of the preliminary stripper through distributing device 20, receiving liquid from line 21. To regulate and facilitate discharge of the liquid through line 21, I have shown pump 22. A pump here is a matter of convenience. Leading to the pump is pipe 23 withdrawing charged wash oil from the base of diagrammatically shown scrubbing device 24 through which natural gas passes upward, entering by pipe 25 and distributor 26 and leaving by pipe 27. The stripped and chilled scrubbing oil is taken from the base of the high vacuum stripping device by line 28 leading to pump 29 and via pipe 30 to the top of the scrubbing tower in which it is distributed by distributing device 31.

The operation of the apparatus is believed to be clear from the description. Gas is scrubbed by any suitable absorbent oil in 24 and the charged scrubbing oil goes via 23, 22 and 21 into the top of the preliminary stripper. Here it is relieved of dissolved gas and highly volatile oils. The gases and vapors pass by 17 into the base of the high vacuum stripper 11, ascending therethrough in contact with downcoming scrubbing oil; this downcoming oil being that which has yielded the gases and vapors in 14. Under the conjoint influence of the current of gases and vapors and of the relatively high suction, a quick, thorough and ready separation of volatiles occurs, leaving the residual oil very cold and suited for reuse. It passes from the high vacuum stripper via 28, 29 and 30 to the scrubbing tower to serve anew. The gases and vapors coming from 11 pass through 10 under the suction of pump 1 and are compressed and cooled somewhat, any condensate being trapped off in 3. They are then compressed and cooled in 5 and 6.

What I claim is:—

1. In the recovery of gasoline from natural gas and the like by scrubbing with oil, the process of recovering gasoline from the charged oil which comprises subdividing such oil to offer extensive surfaces at or near atmospheric pressure, collecting evolved vapors and gases, again subdividing the oil at a pressure materially below atmospheric and transmitting said evolved vapors and gases in countercurrent to said oil in the second subdividing.

2. In the recovery of gasoline from natural gas and the like by scrubbing with oil, the process of recovering gasoline from the charged oil which comprises filming out such oil at or near atmospheric pressure, collecting evolved vapors and gases, again filming out the oil at a pressure materially below atmospheric and transmitting said evolved vapors and gases in countercurrent to said oil in the second filming out.

In testimony whereof, I have hereunto affixed my signature.

FRED E. HOSMER.